United States Patent [19]

Pedrazzi

[11] Patent Number: 4,465,627
[45] Date of Patent: Aug. 14, 1984

[54] SULFO GROUP-FREE DISAZO, TRISAZO AND TETRAKISAZO COMPOUNDS CONTAINING AT LEASE ONE BASIC OR CATIONIC GROUP

[75] Inventor: Reinhard Pedrazzi, Allschwil, Switzerland

[73] Assignee: Sandoz Ltd., Basel, Switzerland

[21] Appl. No.: 290,912

[22] Filed: Aug. 7, 1981

[30] Foreign Application Priority Data

Aug. 9, 1980 [DE] Fed. Rep. of Germany ....... 3030196

[51] Int. Cl.³ .................... C09B 33/02; C09B 33/18; C09B 44/02; C09B 44/08
[52] U.S. Cl. .................... 260/153; 260/152; 260/155; 260/156; 260/166; 260/167; 260/168; 260/169; 260/170; 260/172; 260/173; 260/174; 260/175; 260/178; 260/184; 260/187
[58] Field of Search ............... 260/166, 167, 168, 169, 260/170, 172, 173, 174, 175, 184, 187, 178, 153, 155, 156, 152

[56] References Cited

U.S. PATENT DOCUMENTS

| | | | |
|---|---|---|---|
| 3,895,004 | 7/1975 | de Montmollin et al. | 260/152 |
| 3,910,876 | 10/1975 | James | 260/191 |
| 3,912,712 | 10/1975 | Petept et al. | 260/152 |
| 3,987,022 | 10/1976 | James | 260/146 |

FOREIGN PATENT DOCUMENTS

| | | |
|---|---|---|
| 24321 | 3/1981 | European Pat. Off. . |
| 24322 | 3/1981 | European Pat. Off. . |
| 913860 | 12/1962 | United Kingdom . |
| 1220462 | 1/1971 | United Kingdom . |
| 2019873 | 11/1979 | United Kingdom . |

*Primary Examiner*—Floyd D. Higel

*Attorney, Agent, or Firm*—Gerald D. Sharkin; Richard E. Vila; Melvyn M. Kassenoff

[57] ABSTRACT

Disazo, trisazo and tetrakisazo compounds of the formula $$(Z)_n - \left[ D_1 \begin{array}{c} (Z_Z)_b \\ \diagup \\ \diagdown \end{array} - (N=N-K_1)_m - N=N-K_2 - Y - \right.$$

$$\left. -K_2 - N=N - (K_1 - N=N)_m - D_1 \begin{array}{c} (Z_Z)_b \\ \diagdown \\ \diagup \end{array} \right],$$

in which
each $D_1$ independently is a disazo component of the aniline series or the naphthylamine series;
each $K_1$ independently is a coupling and disazo component of the aniline series or the naphthylamine series;
each $K_2$ independently is a coupling component of the aniline series or the naphthylamine series;
each m independently is 0 or 1;
Y is a bridging group attached to the amino group of each $K_2$, which bridging group is other than one having two alkylene end groups;
Z and $Z_Z$ are basic or cationic groups;
b is 0 to 2; and
n is at least 1,
with the proviso that the compounds are free of sulfo groups,
are useful as dyes for dyeing and printing cellulosic substrates such as cotton and paper and leather, particularly paper.

15 Claims, No Drawings

SULFO GROUP-FREE DISAZO, TRISAZO AND TETRAKISAZO COMPOUNDS CONTAINING AT LEASE ONE BASIC OR CATIONIC GROUP

The invention relates to sulphonic acid group free azo compounds containing at least one basic or cationic group or at least one of each, acid addition salts of such compounds and processes for the preparation of the azo compounds of the invention and their acid addition salts.

The azo compounds of the invention are useful as dyestuffs.

According to the invention there is provided sulphonic acid group free dis-, tris- and tetrakis-azo compounds of formula I

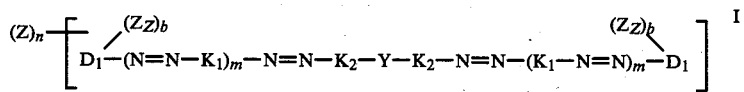

in which
each $D_1$ independently is a diazo component radical of the aniline series or the naphthylamine series;
each $K_1$ independently is a coupling and diazo component radical of the aniline series or the naphthylamine series;
each $K_2$ independently is a coupling component radical of the aniline series or the naphthylamine series;
each m independently is 0 or 1;
Y is a bridging group attached to the amino group of each $K_2$ which bridging group is other than one having two alkylene end groups preferably a carbonyl group, a —CO—R—CO— group or a triazinyl group, where R is a direct bond, $C_{1-4}$-alkylene, $C_{2-4}$alkenylene or $C_{6-10}$arylene;
n is at least 1;
b is 0 to 2;
Z has the significance of
(i) —CO—X;
—SO$_2$—X;

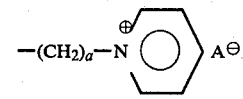

(ii) a cationic group of the formula
—CO—(CH$_2$)$_a$—N$^\oplus$(R$_8$)$_3$ A$^\ominus$;
—NHCO—(CH$_2$)$_a$—N$^\oplus$(R$_8$)$_3$ A$^\ominus$;

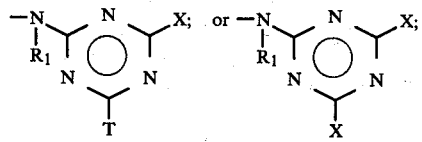

—NHNH—CO—CH$_2$—N$^\oplus$(R$_8$)$_3$ A$^\ominus$;

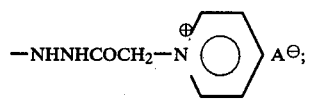

(iii) a basic group of the formula
—CO—(CH$_2$)$_a$—N(R$_8$)$_2$;
—NH—CO—(CH$_2$)$_a$—N(R$_8$)$_2$; or
—NH—NH—CO—CH$_2$—N(R$_8$)$_2$;
in which $R_1$ is hydrogen or $C_{1-4}$alkyl;
T is halogen (preferably chlorine), hydroxy, —NH$_2$, an aliphatic or aromatic amino group or a saturated heterocyclic amino group in which the N atom is included in the heterocyclic ring;
each X independently is a basic group —NR$_2$—Q—NR$_3$R$_4$ or a cationic group —NR$_2$—Q—N$^\oplus$R$_5$R$_6$R$_7$
Q is a linear or branched (C$_{2-6}$)-alkylene group or —NH—CO—CH$_2$—;
$R_2$ is hydrogen or $C_{1-4}$alkyl;
$R_3$ and $R_4$ independently are hydrogen; unsubstituted $C_{1-6}$alkyl; $C_{2-6}$-alkyl substituted with a hydroxy or a cyano group; phenyl-$C_{1-3}$-alkyl in which the phenyl group is substituted by up to 3 substituents selected from chlorine, $C_{1-4}$alkyl and $C_{1-4}$alkoxy; unsubstituted $C_{5-6}$cycloalkyl or $C_{5-6}$cycloalkyl substituted by 1 to 3 $C_{1-4}$alkyl groups; or
$R_3$ and $R_4$ together with the N atom to which they are attached form a 5- or 6-membered saturated or unsaturated ring optionally containing a further heteroatom;
$R_5$ and $R_6$ have the significances of $R_3$ and $R_4$ except that neither $R_5$ nor $R_6$ is hydrogen;
$R_7$ is $C_{1-4}$alkyl or benzyl; or
$R_5$, $R_6$ and $R_7$ together with the N atom to which they are attached form a pyridinium cation which may be substituted by up to 2 methyl groups;
a is 1 to 3;
$R_8$ is $C_{1-4}$alkyl;
A$^\ominus$ is a non-chromophoric anion; and
each $Z_Z$ independently is a group of the formula —(CH$_2$)$_a$N$^\oplus$(R$_8$)$_3$ A$^\oplus$;

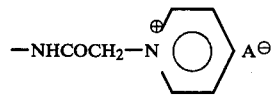

or —N$^\oplus$(R$_8$)$_3$ A$^\ominus$ where a, R$_8$ and A$^\ominus$ are defined above,
and acid addition salts of the compounds of formula I. Preferably b=0.

Preferably the total number of Z groups is 1 to 8, more preferably 1 to 6, most preferably 2 to 4.

Preferably the disazo compounds of formula I have 2 basic or cationic groups Z which may be the same or different.

Preferably Q is Q' where Q' is linear or branched (C$_{2-6}$) alkylene. Preferably Q' is a linear alkylene group, more preferably an ethylene or 1,3-propylene group, most peferably a 1,3-propylene group.

When $R_1$ or $R_2$ is alkyl, methyl is preferred. $R_1$ is preferably $R_1'$, where $R_1'$ is hydrogen or methyl, preferably hydrogen.

$R_2$ is preferably $R_2'$ where $R_2'$ is hydrogen or methyl, preferably hydrogen.

R3 and R4 can be the same or different but are preferably the same.

When R3 or R4 is a $C_{1-6}$alkyl group this may be linear or branched, preferably $C_{1-4}$alkyl, more preferably methyl or ethyl.

When R3 or R4 is a cyano- or hydroxy-substituted $C_{2-6}$alkyl moiety, the alkyl group preferably two or three carbon atoms with the proviso that the cyano or hydroxy substituent is not in the 1-position.

When R3 or R4 is a phenyl alkyl group, the phenyl ring is preferably unsubstituted, and benzyl is most preferred.

When R3 is R4 is cycloalkyl, cyclohexyl is preferred; and when R3 or R4 is alkyl substituted cycloalkyl the cycloalkyl is preferably substituted by methyl.

When R3 and R4 together with the N atom to which they are attached form a ring, pyrrolidine, piperidine and morpholine are preferred.

R3 and R4 are preferably $R_3'$ and $R_{4'}$ respectively where $R_3'$ and $R_4'$, independently are hydrogen, linear or branched $C_{1-6}$alkyl, unbranched hydroxy ($C_{2-3}$) alkyl, benzyl or $R_3'$ and $R_4'$ together with the N atom to which they are attached form a pyrrolidine ring, a piperidine ring or a morpholine ring.

More preferably R3 and R4 are $R_3''$ and $R_4''$, respectively, where $R_3''$ and $R_4''$ independently are hydrogen, linear or branched $C_{1-4}$alkyl and 2-hydroxyethyl or $R_3''$ and $R_4''$ together with the N atom to which they are attached form a piperidine ring or a morpholine ring. Most preferably R3 and R4 are $R_3'''$ and $R_4'''$, respectively, where $R_3'''$ and $R_4'''$ independently are selected from methyl and ethyl.

R5 and R6 can both be the same or different but however are preferably the same.

Preferably R5 and R6 are $R_5'$ and $R_6'$, respectively, where $R_5'$ and $R_6'$ are selected from linear or branched $C_{1-6}$alkyl, unbranched hydroxy $C_{2-3}$alkyl and benzyl or $R_5'$, $R_6'$ and $R_7'$ together with the N atom to which they are attached form a pyridinium cation substituted by up to 2 methyl groups.

More preferably R5 and R6 are $R_5''$ and $R_6''$ where $R_5''$ and $R_6''$ are selected from linear or branched $C_{1-4}$alkyl and 2-hydroxyethyl or $R_5''$, $R_6''$ and $R_7'$ together with the N atom to which they are attached form a pyridinium cation.

Most preferably R5 and R6 are $R_5'''$ and $R_6'''$, respectively, where $R_5'''$ and $R_6'''$ are selected from methyl and ethyl.

When R7 is alkyl this is preferably methyl or ethyl, more preferably methyl.

R7 is preferably $R_7'$ where $R_7'$ is methyl, ethyl or benzyl or together with R5 and R6 and the N atom to which they are bonded forms a pyridinium cation substituted with up to two methyl groups.

Most preferably R7 is methyl or together with R5 and R6 and the N atom to which they are bonded forms a pyridinium cation.

When X is a basic group, this is preferably Xa, more preferably Xb, still most preferably Xc. Especially preferred is Xd and most preferred is Xe where
Xa is $-NR_2'-Q-NR_3'R_4'$;
Xb is $-NR_2'-Q'-NR_3''R_4''$;
Xc is $-NR_2'-(CH_2)_{2-6}-NR_3''R_4''$;
Xd is $-NR_2'-(CH_2)_{2-3}-NR_3''R_4''$; and
Xe is $-NH-(CH_2)_3-NR_3'''R_4'''$,
where all the significances are as defined above.

When X is a cationic group this is preferably Xf, more preferably Xg, still more preferably Xh, especially Xi and most preferably Xj where
Xf is $-NR_2'-Q-N^{\oplus}R_5'R_6'R_7'\ A^{\ominus}$
Xg is $-NR_2'-Q'-N^{\oplus}R_5''R_6''R_7'\ A^{\ominus}$
Xh is $-NR_2'-(CH_2)_{2-6}-N^{\oplus}R_5''R_6''R_7'\ A^{\ominus}$;
Xi is $-NR_2'-(CH_2)_{2-3}-N^{\oplus}R_5'''R_6'''R_7'\ A^{\ominus}$; and
Xj is $-NR_2'-(CH_2)_{2-3}-N^{\oplus}(CH_3)_3\ A^{\ominus}$ or

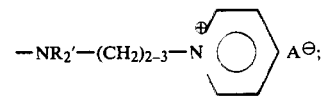

where all the significances are as above defined.

When X is a cationic group, the anion $A^{\ominus}$ which is not a critical factor may be an inorganic or organic nonchromophoric anion. Examples of such anions are: chloride, bromide, iodide, lactate, acetate, formate, citrate, methylsulphate, ethylsulphate and hydrogen sulphate anions.

When T is an aliphatic amino group, this is preferably a monoalkylamino group, dialkylamino group or $C_{5-6}$ cycloalkylamino group; in the monoalkyl- and dialkylamino groups the alkyl group is a linear or branched $C_{1-4}$alkyl group, unsubstituted or substituted, preferably by halogen (such as chlorine or bromine) or more preferably hydroxy.

When T is an aromatic amino group T is preferably an unsubstituted anilino group or an aniline group in which the phenyl group is substituted by 1 or 2 substituents selected from halogen (preferably chlorine), $C_{1-4}$alkyl, $C_{1-4}$alkoxy, hydroxy and phenoxy.

When T is a saturated heterocyclic amino group, a morpholine group attached through the N atom is preferred.

T is preferably Ta where Ta is $-Cl$, $-OH$, $-NH_2$, mono- or di-$(C_{1-4})$alkylamino, monohydroxy$(C_{2-4})$alkylamino, bis[hydroxy-$(C_{2-4})$alkyl]amino, anilino or morpholino. More preferably T is Tb where Tb is $-Cl$, $-OH$, $-NH_2$, mono$(C_{1-2})$alkylamino, monohydroxy$(C_{2-4})$alkylamino or bis[hydroxy$(C_{2-4})$alkyl]amino.

Preferably Z is Za or Zb where
Za is $-COXa$; $-COXj$; $-SO_2Xa$; $-CO(CH_2)_a N(C_{1-2}alkyl)_2$ or $-COCH_2N^{\oplus}(CH_3)_3 A^{\ominus}$; and
Zb is $-NH-CO-CH_2-N(C_{1-2}alkyl)_2$;
$-NH-CO-CH_2-N^{\oplus}(CH_3)_3\ A^{\ominus}$ or

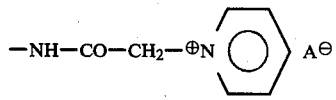

where X' is Xa or Xj and all the other significances are as defined above.

More preferably Z is Za' or Zb' where Za' is —COXb, COXj or —COCH$_2$N$^\oplus$(CH$_3$)$_3$A$^\ominus$; and Zb' is

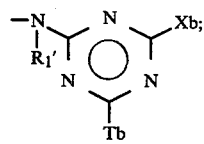

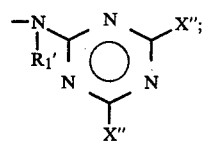

—NH—CO—CH$_2$—N(C$_{1\text{-}2}$alkyl)$_2$;
—NH—CO—CH$_2$—N$^\oplus$(CH$_3$)$_3$ A$^\ominus$; or

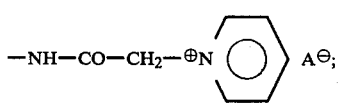

where X" is Xb or Xj and the other significances are defined above.

Still more preferably Z is —COXd or Zb" where Zb" is

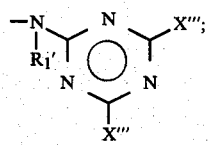

—NH—CO—CH$_2$—$^\oplus$N(CH$_3$)$_3$ A$^\oplus$ or

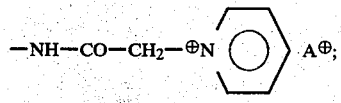

where X''' is Xc or XjA$^\ominus$ as defined above.
Most preferably Z is —COXd or Zb''', where Zb''' is

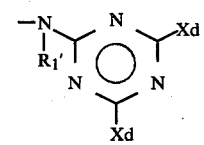

Preferably Xd is Xe. All the significances are as defined above.

If the compound of formula I is considered as two half units joined together by the group Y then when a half unit contains a Za group this is preferably attached to D$_1$ and if there is a second (or further) Za group present, this is or these are also preferably attached to D$_1$. When a half unit contains a Zb group it is preferably attached to K$_2$ and if a second Zb unit is present this is preferably on D$_1$.

The bridging group Y is preferably Ya where Ya is a divalent group —CO—; —COCH=CHCO—; —CO(CH$_2$)$_{2\text{ or }3}$CO—;

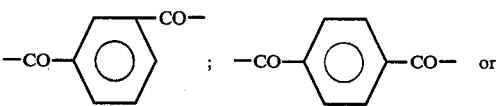

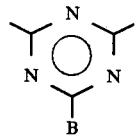

where B has the significance of T or X above defined.
More preferably Y is Yb where
Yb is —CO—; —CO—CH=CH—CO—; —CO(CH$_2$)$_2$—CO—;

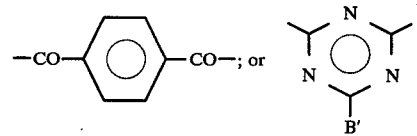

where B' has the significances of Ta, Xb or Xj defined above.
More preferably Y is Yc where
Yc is —CO—; —CO—CH=CH—CO—;

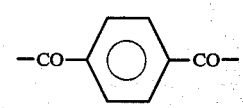

—CO—CH$_2$—CH$_2$—CO—; or

where B" has the significance of Tb, Xd or Xj defined above. Preferably Yc is —CO—.

Preferably each group K$_1$ and K$_2$ is a group of formula

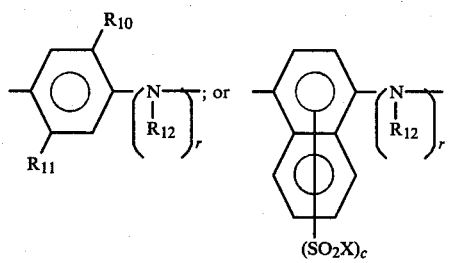

in which
r is 1 for a K$_2$ group and r is zero for a K$_1$ group, $R_{10}$ is hydrogen, $C_{1-4}$alkyl or $C_{1-4}$alkoxy;
$R_{11}$ is hydrogen, halogen, $C_{1-4}$alkyl, $C_{1-4}$alkoxy, -NHCO-($C_{1-4}$alkyl), -NH-CONH$_2$ or Zb;
$R_{12}$ is hydrogen or $C_{1-4}$alkyl;
c is 0, 1 or 2,
and the other significances are as defined above.

Preferably $R_{10}$ is $R_{10}'$ where $R_{10}'$ is hydrogen, methyl or methoxy.

Preferably $R_{11}$ is $R_{11}'$ where $R_{11}'$ is hydrogen, chlorine, methyl, methoxy, —NHCOCH$_3$, —NHCONH$_2$ or $Z_b''$; more preferably $R_{11}$ is $R_{11}''$ where $R_{11}''$ is hydrogen, methyl, methoxy, —NHCOCH$_3$ or —NHCONH$_2$. Most preferably $R_{11}$ is $R_{11}'''$ where $R_{11}'''$ is hydrogen, —CH$_3$, —OCH$_3$ or —NH—CO—CH$_3$.

Preferably $R_{12}$ is $R_{12}'$ where $R_{12}'$ is hydrogen or methyl, more preferably $R_{12}$ is hydrogen.

c is preferably 0.

When each $D_1$ independently is selected from the aniline series, the phenyl group may be additionally substituted by substituents (preferably by one or two substituents) selected from halogen; $C_{1-4}$alkyl; $C_{1-4}$alkoxy; mono($C_{1-4}$)alkylamino; di($C_{1-4}$)alkylamino; phenoxy; —NHCO($C_{1-4}$)alkyl; —NHCOC$_6$H$_5$; —SO$_2$($C_{1-4}$)alkyl; —SO$_2$C$_6$H$_5$; —SO$_2$N(R$_9$)$_2$ or —CON(R$_9$)$_2$, where each R$_9$ independently is hydrogen or $C_{1-4}$alkyl.

Further to these additional substituents, Zz groups (preferably 1 or 2) may be present on $D_1$.

When $D_1$ is selected from the aniline series and bears one Z group this group is preferably
(a) in the 3-position (with respect to the azo bridging group) in which case preferably there is either no further substituent or one substituent in the 4-, 5- or 6-position or 2 further substituents preferably in the 2,5-positions present on the D group;
(b) in the 4-position (with respect to the azo bridging group) in which case preferably there is no further substituent or only one additional substituent (in the 2- or 3-position) present on the $D_1$ group. When $D_1$ is selected from the aniline series and bears 2 groups Z these are preferably identical and are preferably in the 2,5- or 3,5-positions (with respect to the azo bridging group) in which case there is preferably no further substituent or one additional substituent.

When $D_1$ is selected from the naphthylamine series the naphthyl group is preferably unsubstituted or substituted by one or two Z groups wherein Z is —SO$_2$X, X being defined above.

Where $D_1$ has a Z group attached $D_1$ is preferably Z—D' where D' is unsubstituted phenyl; phenyl substituted by one or two substituents selected from halogen (preferably chlorine), $C_{1-4}$alkyl (preferably methyl), $C_{1-4}$alkoxy (preferably methoxy) and mono- and di-$C_{1-4}$alkylamino; or 1- or 2-naphthyl, with the proviso that when D' is 1- or 2-naphthyl, the Z group attached to D' is the group —SO$_2$Xa.

Where $D_1$ has no Z group attached $D_1$ is preferably Da where Da is

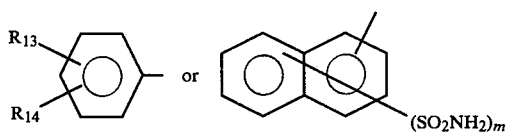

in which $R_{13}$ is hydrogen, halogen, $C_{1-4}$alkyl, $C_{1-4}$alkoxy, phenoxy, —NHCO($C_{1-4}$)alkyl, —NHCOC$_6$H$_5$, —SO$_2$($C_{1-4}$)alkyl, —SO$_2$C$_6$H$_5$; SO$_2$N(R$_9$)$_2$ or —CON(R$_9$)$_2$ and $R_{14}$ is hydrogen, halogen, $C_{1-4}$alkyl or $C_{1-4}$alkoxy where R$_9$ is defined above, and m is above defined.

Preferably $R_{13}$ is $R_{13}'$ where $R_{13}'$ is hydrogen, chlorine, methyl, methoxy, acetylamino, benzoylamino, —SO$_2$NH$_2$, or —CO—NH$_2$. More preferably $R_{13}$ is $R_{13}''$ where $R_{13}''$ is hydrogen, chlorine, methyl, methoxy or acetylamino. Most preferably $R_{13}$ is hydrogen.

Preferably $R_{14}$ is $R_{14}'$ where $R_{14}'$ is hydrogen, chlorine, methyl or methoxy. More preferably $R_{14}$ is hydrogen.

Preferably Da is Da' where Da' is

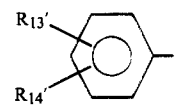

and more preferably Da is Da'' where Da'' is

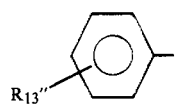

Preferred compounds of formula I are of the formula

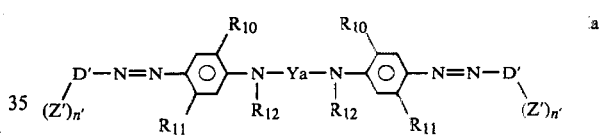

a where
each Z' independently is Za or Zb;
each n' independently is 1 or 2; and
Ya and each of the other significances independently is as defined above.

Preferred compounds of formula Ia are of formula Ia'

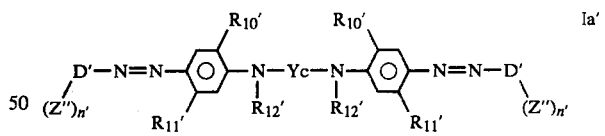

Ia' those of formula Ia wherein each Z'' independently is Za' or Zb'.

Most preferred compounds of formula Ia are where Z''=Zb'', n' is 1, $R_{11}'$ is $R_{11}'''$ and Yc is —CO—.

Alternatively preferred compounds of formula I are of formula Ib

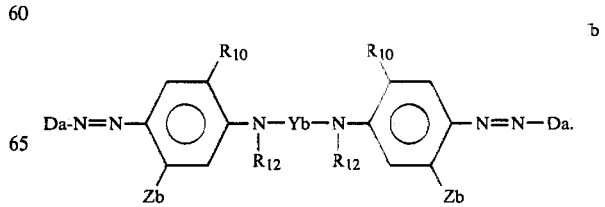

b

Preferred compounds of formula Ib are those of formula Ib'

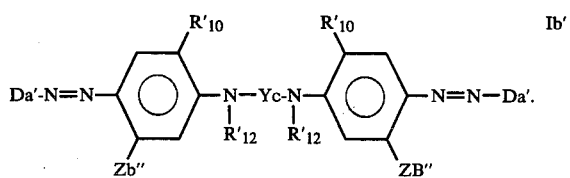

Preferably Yc is —CO— and Zb" is Zb'".

Further alternatively preferred compounds of formula I are of formula Ic

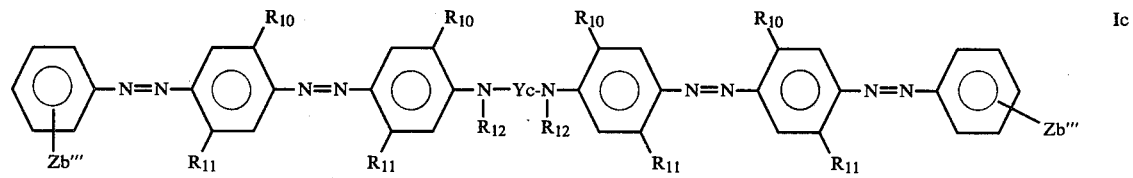

Preferred compounds of formula Ic are of formula Ic'

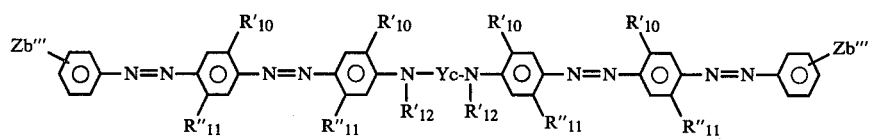

All the significances unless indicated to the contrary are defined above and generally halogen refers to fluorine, chlorine or bromine. Where the same symbol appears more than once in any formula, unless indicated to the contrary it may signify the same or a different group. Preferably the compounds of formula I are symmetric.

The compounds of formula I may be prepared by condensing a compound of formula II

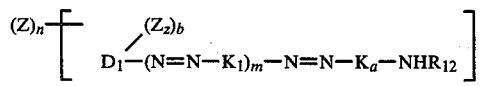

where $K_a NR_{12}$— is $K_2$ as defined in above with another compound of formula II which may be the same or different and a Y-bridge yielding compound. The condensation may be carried out by conventional methods. Preferred Y-bridge yielding compounds are acid halides, in particular acid dichlorides such as phosgene, the dichlorides of fumaric acid, oxalic acid, malonic acid, succinic acid and higher homologues, terephthalic acid or isophthalic acid or cyanuric halides and derivatives thereof.

The resulting compounds of formula I can be isolated from the reaction mixture by known methods.

The basic group-containing compounds of formula I can be converted into water-soluble salt form by adding a stoichiometric amount of an inorganic acid such as hydrochloric acid, sulphuric acid and phosphoric acid or preferably an organic acid, for example formic acid, acetic acid, lactic acid, citric acid, glycollic acid and methane sulphonic acid.

In the compounds of formula I a portion of the compound in free base form (i.e. a non-protonated X group) can be converted into a quaternary ammonium carrying cationic group by treating with an alkylating agent containing $R_7$ groups.

The compounds of formula II can be prepared according to known methods, for example by coupling the requisite diazo component with the required coupling component and introducing the Z group either before or after coupling.

Compounds of formula I in the form of their water-soluble acid salts and quaternary ammonium salts are dyestuffs useful for dyeing or printing substrates consisting of or containing cellulosic fibres, for example cotton, or, preferably, for the dyeing or printing of paper. They may also be used for dyeing or printing leather, particularly vegetable-tanned low-affinity leather. Cotton may for example be dyed by an exhaust dyeing process at room temperature to the boil or printed with printing pastes of conventional type. Printing may be carried out for instance by the use of a printing paste or impregnation.

The compounds of formula I (in water-soluble acid addition salt or quaternary ammonium salt form) are useful for dyeing paper, for example in the production of a dyed sized or unsized web and for printing paper according to conventional methods. The compounds of formula I (in water-soluble acid addition salt or quaternary ammonium salt form) may be used for dyeing or printing leather, in particular low affinity leather, which has been vegetable tanned according to known methods.

The dyeings and printings (particular on paper) produced by dyes according to the invention have good fastness properties.

Compounds of formula I may also be used in the form of liquid or solid dye compositions. They may be produced in the form of stable liquid, preferably aqueous, compositions by known methods, preferably by solution in a suitable solvent, optionally in the presence of an auxiliary, for example a stabiliser. Such compositions may for example be prepared as disclosed in French Pat. No. 1,572,030. The suitable liquid composition is for example the following (parts are by weight):

100 parts compound of formula I as acid addition salt
1–100, preferably 1–10, parts inorganic salt
1–100 parts of an organic acid, e.g. formic, acetic, lactic or citric acid
100–800 parts water
0–500 parts of a solubilising agent, for example glycols such as diethylene, triethylene or hexylene glycol; glycol ethers such as Methyl Cellosolve ®, Methyl Carbitol ®, butylpolyglycol; urea; formamide; dimethylformamide, etc.

The compounds of formula I may also be prepared in solid, preferably granular, form, preferably by granulating as described in French Pat. No. 1,581,900. A suitable solid composition is for example the following (parts are by weight):
100 parts compound of formula I as acid addition salt
1-100, preferably 1-10, parts inorganic salt
0-800 parts of a filler, preferably a nonionic material such as dextrin, sugar, glucose or urea.

The solid compositions may contain up to 10% residual moisture.

The dyestuffs of formula I, in the form of their acid addition salts, have good solubility properties, particularly good solubility in cold water. When used in papermaking, they colour the waste water only slightly or not at all which is desirable for ecological reasons. They do not give mottling of the dyed paper, and are insensitive to pH over wide ranges. The resulting dyeings on paper are brilliant and are characterised by good lightfastness; after long illumination the shades change tone-in-tone. The dyed paper is fast not only to water but also to milk, fruit juices and sweetened mineral water; because of the good alcohol fastness of the dyes they are also resistant to alcoholic drinks.

The dyes exhibit high substantivity, that is they exhaust practically quantitatively on the substrate. They may be added to the paper mass directly in the form of a dry powder or granulate, without first making up a solution, without loss of brilliance or yield. There is practically no difference in the take up between sized and unsized paper. The dyes according to the invention may also be used in soft water without loss of yield.

Fibrous materials containing wood pulp are dyed with the dyestuffs according to the invention in good and level quality.

The dyed paper is both oxidatively and reductively bleachable, which is important for the recycling of waste paper.

The following Examples, in which solid materials are given as parts by weight and liquids as parts by volume, all percentages are weight percentages and temperatures are in degrees Centigrade, illustrate the invention.

EXAMPLE 1

(A) 44.2 Parts of N-(3'-dimethylaminopropyl)-4-aminobenzamide is dissolved in 200 parts of water and 70 parts of 30% HCl solution and then diazotised with 55 parts of 4N sodium nitrite solution of 0°-5°. After one hour the excess nitrite is destroyed with aminosulphonic acid.

28 Parts of 2-amino-1-methoxy-4-methylbenzene is added to the above solution and the pH is brought to 4 by the addition of sodium acetate. Coupling immediately occurs producing a yellow dyestuff.

After one hour the solution is saturated with sodium chloride, whereby after a long period of stirring the dyestuff precipitates in crystalline form. The dyestuff is vacuum filtered and the solid mass is washed and dried. The dyestuff produced at this stage is of the formula

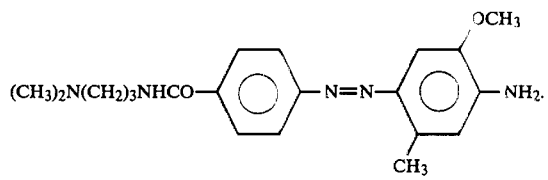

(B) 17.6 Parts of the above compound in powder form are dissolved in 300 parts of water and warmed to 40°. A stream of phosgene is introduced into the solution and the pH of the solution is kept at 5.5 to 6 by the dropwise addition of a 12% solution of NaOH. After about 1 hour thin layer chromatography shows that there is no aminoazo dyestuff left. Phosgenisation is then terminated and a compound of the formula

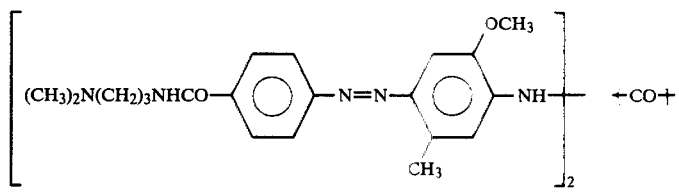

is precipitated with caustic soda solution, vacuum filtered and then dried to give a yellow powder.

The product, in acid addition salt form (for example as an acetic acid addition salt) dyes paper a glowing acid-yellow colour and the paper dyeings so produced have good wet and alcohol fastness properties and outstanding light fastness properties.

(C) Instead of using phosgene in the method of Example 1 acid dihalides may be used. In particular, the dichloride of fumaric, succinic or terephthalic acid or a cyanuric halide in which one of the halogen atoms may be replaced by an organic group (for example a group derived from an amine or alcohol). The dyestuffs so produced are of the same general formula as the product of Example 1 except that the bridging group >CO is replaced by a different bridging group. The chromophoric part of the dyestuff which is the same as that of Example 1 causes these dyestuffs (when in salt form) to dye paper a gold-yellow colour. The dyeings so produced have good wet and alcohol fastness properties and good light fastness properties.

In the product of Example 1 (B) the diazo component may be exchanged for one of a variety of other diazo components carrying a basic group. Such diazo components may be prepared by known methods. An example of such a method is reacting the corresponding diamine with a chloride or dichloride of a nitrobenzene carboxylic or dicarboxylic acid (e. g. nitro-isophthalic or nitroterephthalic acid) followed by reduction to the diazo component.

Further disazo compounds analogous to that of Example 1 may be obtained by using a diazo component derived from p-nitrobenzoic acid and one of the following diamines:
a: $NH_2(CH_2)_2N(CH_3)_2$;
b: $NH_2(CH_2)_3N(C_2H_5)_2$;

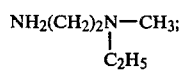

d: $NH_2(CH_2)_2N[CH(CH_3)_2]_2$;
e: $NH_2(CH_2)_2N[(CH_2)_5CH_3]_2$;
f: $NH_2(CH_2)_2N[(CH_2)_5CH_3]_2$;

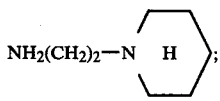

h: $NH_2(CH_2)_6N(CH_3)_2$;
i: $NH_2(CH_2)_6N(CH_3)_2$;
j: $NH_2(CH_2)_3N(CH_2CH_2OH)_2$;
k: $NH_2(CH_2)_2-N^{\oplus}(CH_3)_3Cl^{\ominus}$;
l: $CH_3NH(CH_2)_4N(C_2H_5)_2$.

EXAMPLES 2 TO 68

The compounds of the following Examples 2 to 68 are of the formula

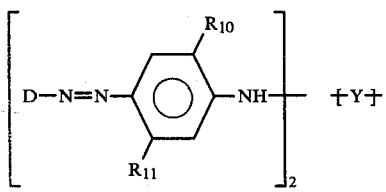

where are prepared by following a method analogous to Example 1 with appropriate starting materials. The significances of D, $R_{10}$, $R_{11}$ and Y are listed in Table 1 below.

In Table 1 the diazo radicals $D_1$ to $D_{12}$ have the significances below:

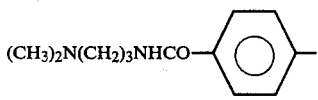

D₁

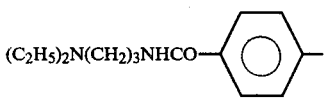

D₂

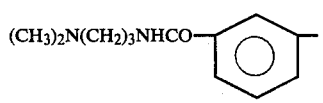

D₃

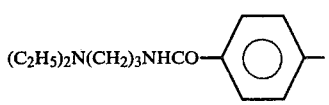

D₄

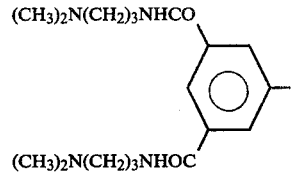

D₅

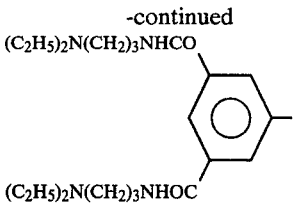

D₆

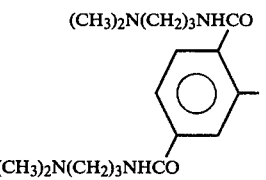

D₇

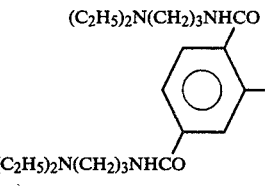

D₈

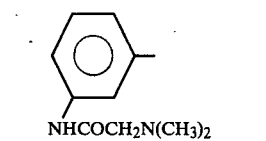

D₉

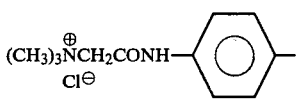

D₁₀

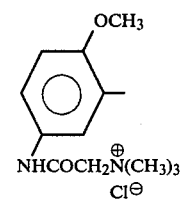

D₁₁

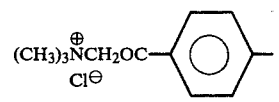

D₁₂

For the production of groups $D_2$ to $D_8$ the corresponding diamine chosen is 3-dimethyl- or 3-diethylaminopropylamine. $D_1$ is the diazo component radical of Example 1.

In Tables 1 to 4 following the column marked "colour" refers to the colour produced by the dyestuff on paper and the following letters signify the colours as below:

a = green/yellow
b = yellow
c = gold yellow
d = reddish yellow
e = orange
f = orange brown.

The compounds of Examples 2 to 68 produce dyeings with good alcohol, wet and light fastness properties.

TABLE 1

| Ex. No. | D | $R_{10}$ | $R_{11}$ | —Y— | colour |
|---|---|---|---|---|---|
| 2 | $D_1$ | H | H | —CO— | a |
| 3 | $D_1$ | H | $CH_3$ | " | b |
| 4 | $D_1$ | $CH_3$ | $CH_3$ | " | b |
| 5 | $D_1$ | $OCH_3$ | $OCH_3$ | " | e |
| 6 | $D_1$ | H | $NHCOCH_3$ | " | b |
| 7 | $D_1$ | H | $NHCONH_2$ | " | b |
| 8 | $D_1$ | $OCH_3$ | H | " | d |
| 9 | $D_1$ | H | Cl | " | d |
| 10 | $D_2$ | $OCH_3$ | $CH_3$ | " | c |
| 11 | $D_2$ | H | H | " | a |
| 12 | $D_2$ | H | H | —COCH=CHCO— | a |
| 13 | $D_2$ | $OCH_3$ | $CH_3$ | " | c |
| 14 | $D_3$ | H | H | —CO— | a |
| 15 | $D_3$ | $OCH_3$ | $CH_3$ | " | c |
| 16 | $D_3$ | " | H | " | d |
| 17 | $D_3$ | " | $OCH_3$ | " | e |
| 18 | $D_3$ | H | $NHCOCH_3$ | " | b |
| 19 | $D_3$ | H | H | —COCH=CHCO— | a |
| 20 | $D_3$ | $OCH_3$ | $CH_3$ | " | c |
| 21 | $D_3$ | $OCH_3$ | $CH_3$ | —CO—⟨C₆H₄⟩—CO— | c |
| 22 | $D_4$ | " | " | " | c |
| 23 | $D_4$ | " | " | —COCH₂CH₂CO— | c |
| 24 | $D_4$ | " | " | —CO— | c |
| 25 | $D_4$ | H | H | " | a |
| 26 | $D_4$ | $OCH_3$ | H | " | d |
| 27 | $D_5$ | " | H | " | d |
| 28 | $D_5$ | H | H | " | a |
| 29 | $D_5$ | H | $NHCOCH_3$ | " | b |
| 30 | $D_6$ | H | " | " | b |
| 31 | $D_6$ | $OCH_3$ | $CH_3$ | " | c |
| 32 | $D_6$ | $CH_3$ | " | " | b |
| 33 | $D_6$ | H | " | —COCH=CHCO— | b |
| 34 | $D_7$ | H | " | " | b |
| 35 | $D_7$ | H | H | —CO—⟨C₆H₄⟩—CO— | a |
| 36 | $D_7$ | $OCH_3$ | $CH_3$ | " | c |
| 37 | $D_7$ | " | " | —CO— | c |
| 38 | $D_7$ | H | $NHCONH_2$ | —CO— | b |
| 39 | $D_7$ | H | $NHCOCH_3$ | " | b |
| 40 | $D_7$ | H | Cl | " | d |
| 41 | $D_7$ | H | H | " | a |
| 42 | $D_7$ | H | $CH_3$ | " | b |
| 43 | $D_7$ | $CH_3$ | $CH_3$ | —CO— | b |
| 44 | $D_8$ | $OCH_3$ | " | | e |
| 45 | $D_8$ | $OCH_3$ | H | " | d |
| 46 | $D_8$ | " | $CH_3$ | " | c |
| 47 | $D_8$ | " | " | —COCH₂CH₂CO— | c |
| 48 | $D_8$ | H | H | " | a |
| 49 | $D_3$ | H | $CH_3$ | —CO— | b |
| 50 | $D_3$ | $CH_3$ | " | " | b |
| 51 | $D_3$ | H | $NHCONH_2$ | " | b |
| 52 | $D_3$ | H | Cl | " | d |
| 53 | $D_5$ | $OCH_3$ | $CH_3$ | " | c |
| 54 | $D_5$ | H | H | —COCH=CHCO— | a |
| 55 | $D_9$ | H | H | " | a |
| 56 | $D_9$ | H | H | —CO— | a |
| 57 | $D_9$ | $OCH_3$ | $CH_3$ | " | c |
| 58 | $D_{10}$ | H | $NHCOCH_3$ | " | b |
| 59 | $D_{10}$ | $OCH_3$ | H | " | d |
| 60 | $D_{10}$ | " | $CH_3$ | " | c |
| 61 | $D_{10}$ | $CH_3$ | " | " | b |
| 62 | $D_{11}$ | " | " | " | b |
| 63 | $D_{11}$ | H | H | —CO—⟨C₆H₄⟩—CO— | a |
| 64 | $D_{12}$ | H | $CH_3$ | " | b |
| 65 | $D_{12}$ | $OCH_3$ | H | —CO— | d |
| 66 | $D_{10}$ | H | H | " | a |
| 67 | $D_{11}$ | H | Cl | —CO— | d |
| 68 | $D_{11}$ | H | H | " | a |

EXAMPLE 69

A disazo compound of the formula

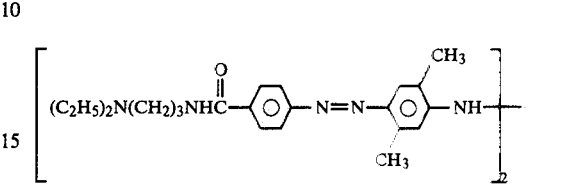

is prepared as follows:

25 Parts of N-(3'-diethylaminopropyl)-4-aminobenzamide is diazotised and then coupled with 12 parts 2,5-dimethylaniline according to the method of Example 1 and a monoazoamino compound of the formula

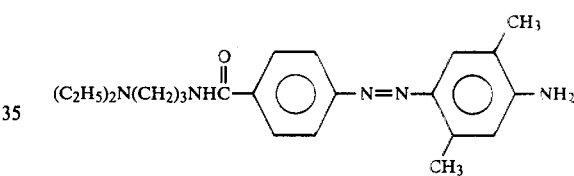

results in solution. The solution is filtered and to the filtered solution 7.6 parts of cyanuric chloride is added. The pH is held at 5 by the dropwise addition of 4N soda solution. As soon as the reaction is completed the temperature is raised to 60° and stirred for a further 3 hours at pH 5. After this time condensation is complete (thin layer chromatography showing that there is no monoazoamino compound left). During condensation the disazo compound to a large extent precipitates out and this is then filtered and dried.

The disazo compound is a yellow powder and when in the form of an acid addition salt, dyes paper in a neutral yellow tone. The dye produces dyeings having extremely good wet, alcohol and light fastness properties.

EXAMPLES 70 TO 82

The compounds of the following Examples 70 to 82 are of the formula

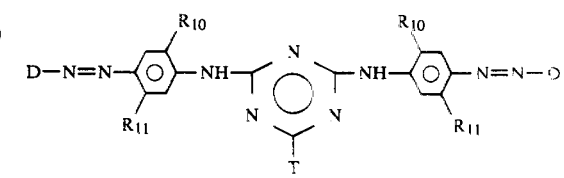

and are prepared by a method analogous with that of Example 69, or by exchanging the chlorine atom of the triazinyl bridging group for an amine group by boiling with an aqueous solution of the corresponding amine.

These compounds produce paper dyeings having good light, wet and alcohol fastness properties.

TABLE 2

| Ex. No. | D | $R_{10}$ | $R_{11}$ | T | colour |
|---|---|---|---|---|---|
| 70 | $D_1$ | $CH_3$ | $CH_3$ | Cl | b |
| 71 | $D_1$ | " | " | $NH_2$ | b |
| 72 | $D_2$ | " | " | $NH_2$ | b |
| 73 | $D_2$ | H | H | $NHC_2H_4OH$ | a |
| 74 | $D_2$ | $OCH_3$ | $CH_3$ | " | c |
| 75 | $D_{10}$ | " | " | $N(CH_3)_2$ | c |
| 76 | $D_1$ | $CH_3$ | " | $N(C_2H_4OH)_2$ | b |
| 77 | $D_2$ | " | " | " | b |
| 78 | $D_9$ | " | " | " | b |
| 79 | $D_4$ | $OCH_3$ | H | " | d |
| 80 | $D_6$ | " | $OCH_3$ | Cl | e |
| 81 | $D_1$ | " | $CH_3$ | Cl | c |
| 82 | $D_2$ | " | " | Cl | c |

EXAMPLE 83

A compound of the formula

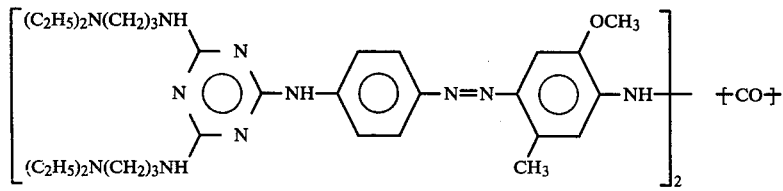

is prepared by diazotising 4-[2′4′-bis-(3″-N,N-diethylaminopropylamino)-s-triazin-6′ylamino]aniline and then coupling the diazotised compound with 2-amino-1-methoxy-4-methylbenzene and then phosgenising by a method analogous to that of Example 1(B).

The dyestuff, when in acid addition salt form (e.g. as the acetic acid addition salt) dyes paper a brilliant reddish-yellow colour and the paper dyeings so produced have good light and wet fastness properties.

Instead of using phosgene, other acid dihalides may be used, for example the dichloride of fumaric, succinic or terephthalic acid; a cyanuric halide or a derivative thereof. The disazo compounds so produced in acid addition salt form also dye paper a reddish-yellow colour and the dyeings so produced have good light and wet fastness properties.

The analine diazo component of the compound of Example 83 is produced from 4-nitroaniline (by reaction with cyanuric chloride and diamine followed by reduction). Further aniline diazo components may be produced for example from the following nitroanilines by similar methods. The nitroanilines are as follows: 3-nitroaniline; 2-chloro- or 2-bromo-nitroaniline; 2-methyl-4-nitroaniline; 2-methoxy-4-nitroaniline; 2-methyl-3-nitroaniline; 4-chloro-3-nitroaniline; 4-methyl-3-nitroaniline; 4-methoxy-3-nitroaniline; 2-methyl-5-nitroaniline, 2-methoxy-5-nitroaniline or 5-chloro-2-methoxy-3-nitroaniline.

EXAMPLES 84 TO 124

The compounds of the following Examples 84 to 124 are of the formula

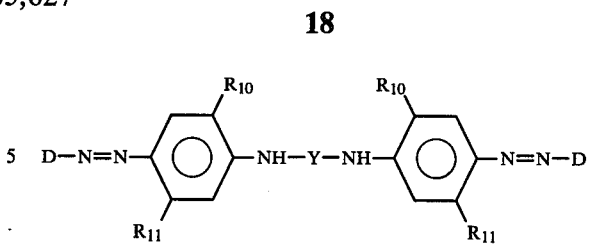

and can be prepared by a method analogous to Example 83.

The significances of D, Y, $R_{10}$ and $R_{11}$ are shown in Table 3 in which the significances of $D_{13}$ to $D_{18}$ are:

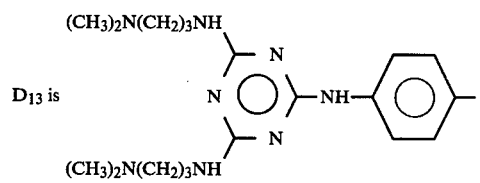

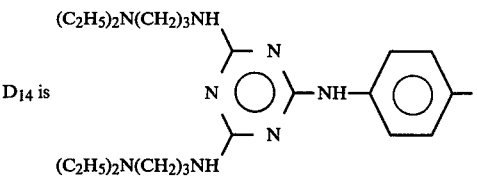

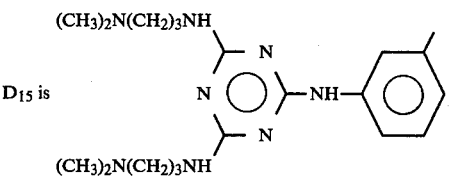

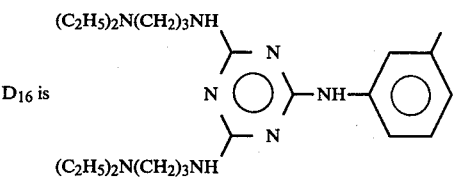

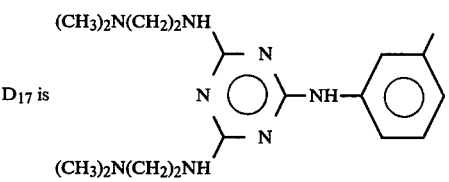

D₁₈ is

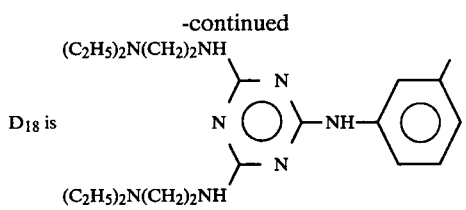

These compounds produce paper dyeings having good light and wet fastness properties.

TABLE 3

| Ex. No. | D | $R_{10}$ | $R_{11}$ | —Y— | colour |
|---|---|---|---|---|---|
| 84 | $D_{13}$ | H | H | —CO— | a |
| 85 | $D_{13}$ | $OCH_3$ | $CH_3$ | " | c |
| 86 | $D_{13}$ | H | " | " | b |
| 87 | $D_{13}$ | $OCH_3$ | $OCH_3$ | —COCH=CHCO— | e |
| 88 | $D_{13}$ | " | H | " | d |
| 89 | $D_{13}$ | H | $NHCOCH_3$ | —CO— | b |
| 90 | $D_{13}$ | H | H | —COCH₂CH₂CO— | a |
| 91 | $D_{14}$ | H | $CH_3$ | —CO— | b |
| 92 | $D_{14}$ | H | H | " | a |
| 93 | $D_{14}$ | $OCH_3$ | $OCH_3$ | " | e |
| 94 | $D_{14}$ | $CH_3$ | $CH_3$ | " | b |
| 95 | $D_{14}$ | H | $NHCOCH_3$ | " | b |
| 96 | $D_{14}$ | H | $NHCONH_2$ | " | b |
| 97 | $D_{14}$ | $OCH_3$ | H | " | d |
| 98 | $D_{14}$ | H | Cl | " | d |
| 99 | $D_{14}$ | $OCH_3$ | H | —COCH=CHCO— | d |
| 100 | $D_{14}$ | " | H | —CO—⌬—CO— | d |
| 101 | $D_{15}$ | " | H | " | d |
| 102 | $D_{15}$ | $OCH_3$ | H | —CO— | d |
| 103 | $D_{15}$ | " | $CH_3$ | " | c |
| 104 | $D_{15}$ | H | " | " | b |
| 105 | $D_{15}$ | H | " | —COCH₂CH₂CO— | b |
| 106 | $D_{16}$ | H | " | " | b |
| 107 | $D_{16}$ | H | " | —CO— | b |
| 108 | $D_{16}$ | $OCH_3$ | $CH_3$ | " | c |
| 109 | $D_{16}$ | " | H | " | c |
| 110 | $D_{16}$ | H | $NHCOCH_3$ | " | b |
| 111 | $D_{16}$ | H | H | " | a |
| 112 | $D_{16}$ | H | H | —COCH₂CH₂CO— | a |
| 113 | $D_{17}$ | H | H | —CO— | a |
| 114 | $D_{17}$ | $OCH_3$ | $CH_3$ | " | d |
| 115 | $D_{17}$ | " | H | " | c |
| 116 | $D_{18}$ | H | H | " | a |
| 117 | $D_{18}$ | $OCH_3$ | $CH_3$ | —COCH₂CH₂CO— | c |
| 118 | $D_{13}$ | " | " | [triazine-NH₂] | c |
| 119 | $D_{14}$ | " | " | " | c |
| 120 | $D_{14}$ | H | H | [triazine] | a |
| 121 | $D_{14}$ | $OCH_3$ | H | " | d |
| 122 | $D_{16}$ | " | H | [triazine-NH-Ph] | † |
| 123 | $D_{16}$ | H | $NHCOCH_3$ | [triazine-NHC₂H₄OH] | ‡ |
| 124 | $D_{17}$ | H | H | [triazine-N(C₂H₄OH)₂] | † |

EXAMPLE 125

A compound of the formula

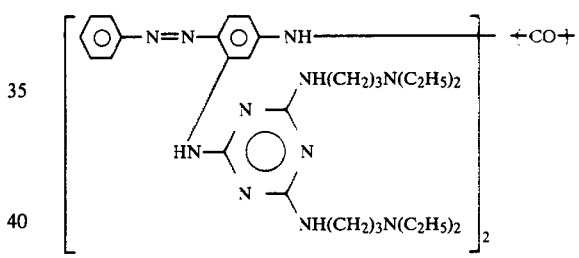

is prepared by coupling 3-[2',4'-bis(3"-N,N-diethylaminopropylamino)-s-triazin-6-yl-amino]aniline with diazotized aniline and converting this to the disazo compound by reacting with phosgene by a method analogous to Example 1.

In the form of an acid addition salt, this compound dyes paper a neutral yellow colour and dyeings so produced have good light and wet fastness properties.

EXAMPLES 126 TO 144

The compounds of the following Examples 126 to 144 are of the formula

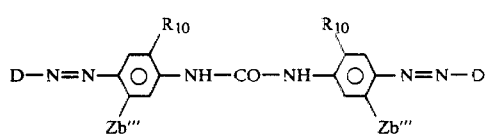

and are prepared by a method analogous to that of Example 125. The significances of D, $Z_b'''$ and $R_{10}$ are given in Table 4 in which Zb1 is Zb1 is 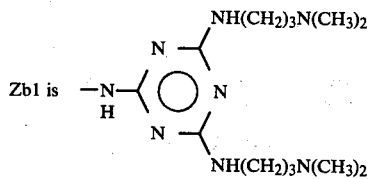

Zb2 is 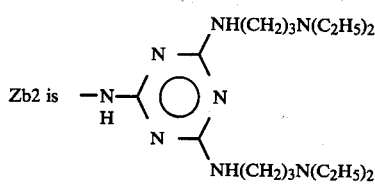

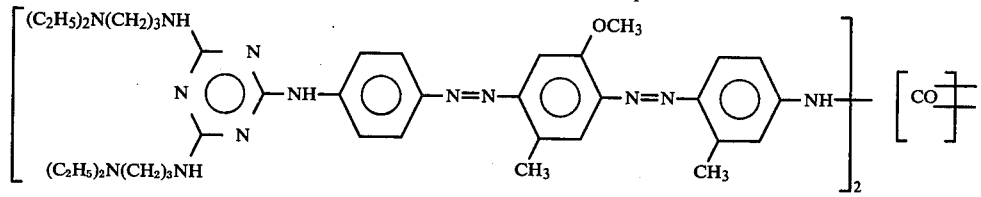

Zb3 is 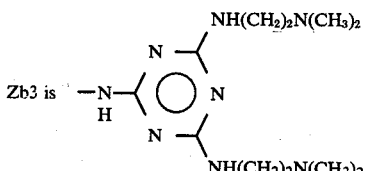

Zb4 is 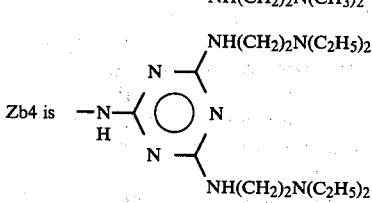

Zb5 is —NH—CO—CH$_2$—$\overset{\oplus}{N}$(CH$_3$)$_3$Cl$^\ominus$—

TABLE 4

| Ex. No. | diazo component | —Z$_b''''$ | R$_{10}$ | colour |
|---|---|---|---|---|
| 126 | aniline | Zb1 | H | b |
| 127 | aniline | Zb1 | OCH$_3$ | e |
| 128 | aniline | Zb2 | OCH$_3$ | e |
| 129 | aniline | Zb5 | H | b |
| 130 | aniline | Zb3 | H | b |
| 131 | 2,5-dimethoxyaniline | Zb1 | H | e |
| 132 | 4-methylaniline | Zb2 | H | d |
| 133 | 4-methylaniline | Zb5 | H | d |
| 134 | 4-methylaniline | Zb1 | CH$_3$ | e |
| 135 | 1-amino-4-acetyl-aminobenzene | Zb1 | H | d |
| 136 | 1-amino-4-acetyl-aminobenzene | Zb2 | H | d |
| 137 | 1-amino-4-acetyl-aminobenzene | Zb5 | H | d |
| 138 | 3-chloro-4-methylaniline | Zb1 | H | d |
| 139 | 3-chloro-4-methylaniline | Zb2 | H | d |
| 140 | 3-chloro-4-methylaniline | Zb2 | OCH$_3$ | e |
| 141 | 1-aminonaphthalene | Zb2 | H | f |
| 142 | 1-aminonaphthalene | Zb1 | H | f |
| 143 | 2-aminonaphthalene-5-sulphonic acid amide | Zb2 | CH$_3$ | f |
| 144 | 2-aminonaphthalene-6-sulphonic acid amide | Zb1 | H | f |

The dyeings on paper have good light and wet fastness properties.

EXAMPLE 145

A tetrakisazo compound of the formula

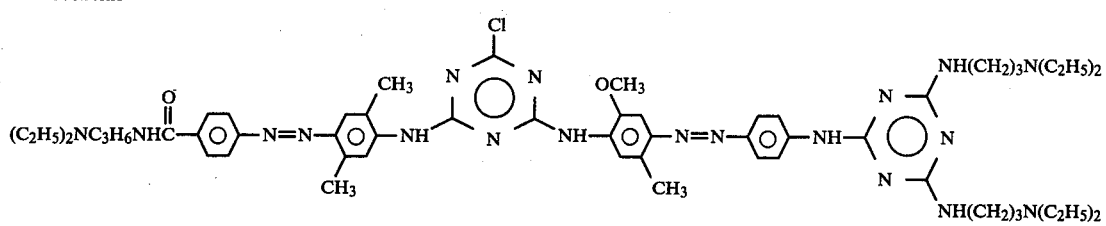

is prepared by diazotising 8.3 parts of 4-[2',4'-bis-(3''-N,N-diethylaminopropylamino)-s-triazin-6'-yl-amino]aniline, and coupling with 2-amino-1-methoxy-4-methylbenzene. The resulting solution is added to 25 parts of 30% hydrochloric acid after which further diazotisation is carried out by reacting with 11 parts of 4N sodium nitrite at 10°–15°. After 1 hour the excess nitrite is removed.

2.1 Parts of 3-aminotoluene is added dropwise and the pH is maintained at 3 to 4 with the addition of sodium hydroxide solution. Coupling takes a short time. The pH of the solution is then brought to 8 to 9 by the addition of sodium hydroxide solution and the aminodisazo dyestuff is salted out. The aminodisazo dyestuff (which precipitates out is nearly 100% product) is filtered and washed with brine. The damp presscake so produced is stirred in 400 parts of water and brought to a pH of 6 by the addition of hydrochloric acid. The resultant solution is warmed to 40° and phosgene is introduced into the solution for a 5 hour period. At the end of the period of phosgenisation the pH is brought to 10 and the dyestuff is filtered, washed with brine and dried.

This compound is a dark powder and in the form of the acid addition salt dyes paper a brown shade and the dyeings so produced have good wet fastness properties.

EXAMPLE 146

A compound of the formula

is prepared by dissolving 38 parts of the compound of of the first part of Example 69) in 300 parts of water and 30 parts of acetic acid. The solution is cooled to 0° and 18.4 parts of cyanuric chloride is added. Whilst stirring, the pH is brought to 6 by the addition of 10% sodium hydroxide solution and the solution is stirred until thin layer chromatography indicates that there is practically no monoazoamino compound left.

ing the resulting solution by a method analogous to that of Example 1 (B).

The acid addition salt of this compound dyes paper a reddish yellow tone and the dyeings so produced have excellent wet fastness and good light fastness.

EXAMPLE 151

A compound of the formula

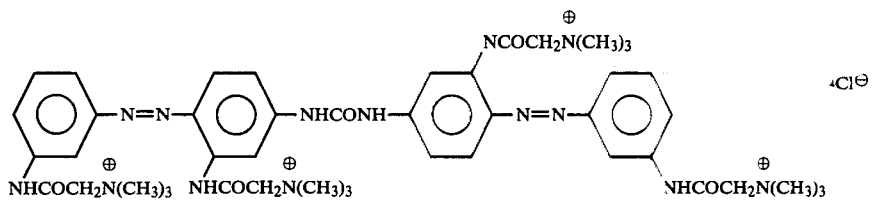

60 Parts of a compound of the formula

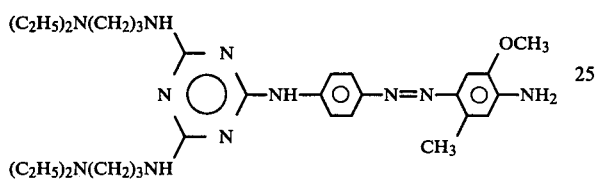

is added to the above solution and the temperature is raised to 60°. The pH is then raised to 6–7 by the dropwise addition of 10% sodium hydroxide.

After two hours condensation is completed, the pH is raised to 9–10 and the product precipitates out. The product is then filtered and dried and the product when in acid addition salt form dyes paper a slightly reddish yellow colour. The dyeings show excellent light- and wet fastness properties.

EXAMPLES 147–149

The chlorine atom of the triazinyl group of the compound of Example 146 can be exchanged for —NH$_2$ (Example 147), —NHC$_2$H$_4$OH (Example 148) or —N(C$_2$H$_4$OH)$_2$ (Example 149) by boiling in excess of aqueous ammonia or amine solution. These dyestuffs dye paper a slightly reddish yellow colour and the dyeings so produced have good light- and wet fastness properties.

EXAMPLE 150

A compound of the formula is prepared as follows:

48 Parts of a compound of the formula are dissolved in 500 parts of water with 50 parts of a 30% hydrochloric acid solution. The solution is cooled to 0° and then 25 parts of 4N sodium nitrite solution are added. The pH is raised to 4–5 by the addition of 10% caustic soda and coupling occurs. After about 2 hours the reaction is terminated and the temperature of the orange dyestuff solution is raised to 50° and a flow of phosgene is introduced. The solution is maintained at this temperature and the pH is held at 5–6 by the addition of caustic soda for the time that phosgene flows through the solution.

After phosgenisation is terminated (this occurs when thin layer chromatography shows that there is no monoazoamino compound present) air is passed through the solution for 1 hour and the product is finally precipitated out with 10% NaCl. The precipitated dyestuff is filtered and as a damp presscake is then dried. The dyestuff dyes paper a reddish yellow tone and the dyeings so produced have good light and wet fastness properties and the remaining dyebath (after dyeing) is colourless.

EXAMPLE 152

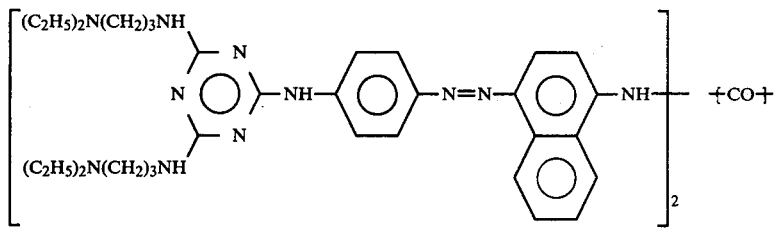

is prepared by diazotising 4-[2′,4′-bis-(3″-N,N-diethylaminopropylamino)s-triazin-6′-yl amino]aniline, coupling with 1-aminonaphthalene and then phosgenis- A compound of the formula

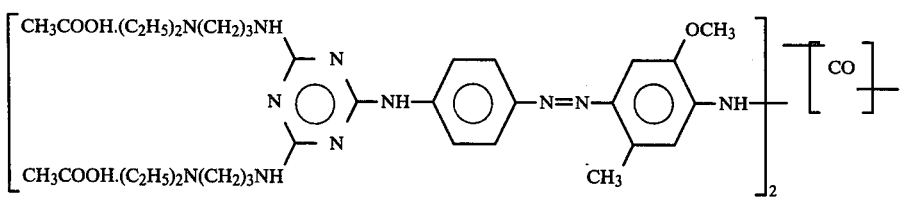

is prepared by dissolving 10 parts of the compound of Example 83 in 300 parts of water and then reacting with 2.4 parts of glacial acetic acid. The dyestuff dissolves completely in the solution and the solution is evaporated to produce a dry product. This product has a high cold water solubility.

In the above method glacial acetic acid may be replaced by inorganic acids such as hydrochloric acid, sulphuric acid or phosphoric acid or (preferably) organic acids such as formic acid and lactic acid.

In a similar fashion the dyestuffs of each of the preceding Examples can be converted into the salt form, provided that they contain a basic group.

EXAMPLE 153

60 Parts of the dyestuff of Example 152 in salt form is dissolved in a solution of 20 parts dextrin, 20 parts glacial acetic acid and 400 parts water and stirred to produce a homogeneous suspension. When passed through a spray dryer a reddish yellow granulate is produced which dissolves well in water and dyes paper a reddish yellow colour. In a similar fashion acid addition salts of other Examples can be so worked up.

EXAMPLE 154

20 Parts of the dyestuff of Example 83 in powder form is dissolved in 75 parts water and 13 parts glacial acetic acid at 60°. The solution is then filtered clear with the assistance of a filter medium such as Kieselguhr or Hyflo (a trade mark). The filtrate is allowed to cool to room temperature and 120 parts water is added. The dyestuff solution, which is stable for storage over many months and shows no sign of dyestuff decomposition, whether in the cold or in the warm, can be directly applied to paper or thinned with water.

The dyestuffs of the other Examples may also in analogous manner be converted into fluid aqueous dyestuff preparations.

APPLICATION EXAMPLE A

100 Parts of freshly tanned and neutralised chrome grained leather are soaked in a bath at 55° C. of 250 parts water and 0.5 parts of the dyestuff of Example 145 (as the acid addition salt) for 30 minutes, then treated for a further 30 minutes in the same bath with 2 parts of an anionic fat liquor based on sulphonated train oil and then dried and finished in conventional manner. The colour of the dyed leather had a level dyeing of yellow-brown nuance.

Calf suede leather, chrome-vegetable-tanned sheepskin and box cowhide leather can also be dyed by known methods.

APPLICATION EXAMPLE B

70 Parts of a chemically bleached sulphite cellulose (from conifer wood) and 30 parts of a chemically bleached sulphite cellulose (from birch wood) is ground in a Hollander with 2000 parts water. 0.5 Parts of dyestuff of compound of Example 83 (as the acid addition salt of Example 152) is added to the mass. After 20 minutes of mixing, paper is produced from the mass. The absorbent paper so produced is a reddish yellow colour and the remaining dyebath is colourless.

APPLICATION EXAMPLE C 0.5 Parts of a dyestuff of Example 83 (as the acid addition salt of Example 152) is dissolved in 100 parts of hot water and cooled to room temperature. The solution is added to 100 parts of chemically bleached sulphite cellulose which has been ground in a Hollander with 2000 parts of water. After 15 minutes mixing the mixture is sized. Paper produced from this mass has a reddish yellow nuance and has good light and wet fastness properties.

APPLICATION EXAMPLE D

An absorbent paper web of unsized paper is drawn through a dyestuff solution of the following constitution:

0.5 parts of the dyestuff of Example 152
0.5 parts starch
99.0 parts of water.

Excess dyestuff solution is squeezed out by pressing between two rollers. The dried paper web is reddish yellow in colour.

Similar good paper dyeings can be obtained by using equivalent quantities of the dyestuffs of the other Examples in salt form or as a liquid preparation or a granular preparation of the dyestuff for the pure dyestuff.

APPLICATION EXAMPLE E

2 Parts of the dyestuff of Example 152 is dissolved in 4000 parts of demineralized water at 40°. 100 Parts of a cotton web is introduced into the bath and heated for 30 minutes at boiling. The bath is held for an hour at boiling, topping up from time to time with water. The dyed cotton web is then taken out of the dyebath, washed with water and then dried. The dyestuff exhausts practically totally onto the fibres and the remaining dyebath is colourless. The dyeing produced has a reddish yellow colour with good light and wet fastness properties.

What is claimed is:

1. A compound of the formula

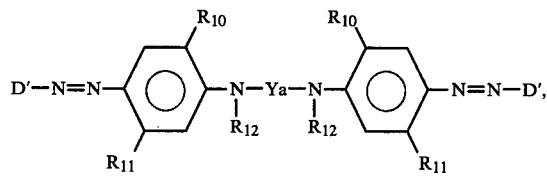

or an acid addition salt thereof,
wherein each $D'$ is independently phenyl subtituted by 1 or 2 $Z'$ groups; phenyl substituted by 1 or 2 $Z'$ groups and by 1 or 2 further substituents each of which is independently halo, $C_{1-4}$alkyl, $C_{1-4}$alkoxy, $C_{1-4}$alkylamino or di-$(C_{1-4}$alkyl)amino or naphthyl substituted by 1 or 2 —$SO_2$—$NR_2'$—Q—$NR_3'R_4'$ groups, wherein each Z' is independently —CO—$NR_2'$—Q—$NR_3'R_4'$, —CO—$NR_2'$—$(CH_2)_q$—$N^{\oplus}(CH_3)_3$ $A^{\ominus}$,

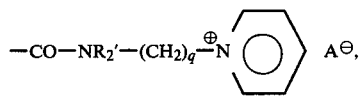

—$SO_2$—$NR_2'$—Q—$NR_3'R_4'$, —CO—$(CH_2)_a$—$N(C_{1-2}$alkyl$)_2$, —CO—$CH_2$—$N^{\oplus}(CH_3)_3$ $A^{\ominus}$, —NH—CO—$CH_2$—$N(C_{1-2}$alkyl$)_2$, —NH—CO—$CH_2$—$N^{\oplus}(CH_3)_3$ $A^{\ominus}$,

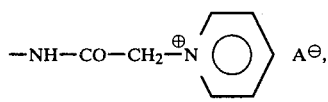

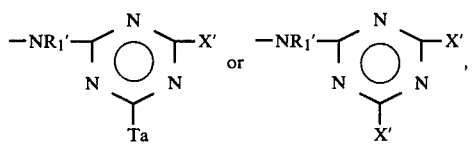

wherein Q is linear or branched $C_{2-6}$alkylene or —NH—CO—$CH_2$—,
$R_1'$ is hydrogen or methyl,
$R_2'$ is hydrogen or methyl,
each of $R_3'$ and $R_4'$ is independently hydrogen, $C_{1-6}$alkyl, 2- or 3-n-$C_{2-3}$hydroxyalkyl or benzyl or —$NR_3'R_4'$ is pyrrolidino, piperidino or morpholino,
Ta is chloro, hydroxy, amino, $C_{1-4}$alkylamino, di-$(C_{1-4}$alkyl)amino, $C_{2-4}$hydroxyalkylamino, di-$(C_{2-4}$hydroxyalkyl)amino, anilino or morpholino,
each X' is independently —$NR_2'$—Q—$NR_3'R_4'$, —$NR_2'$—$(CH_2)_q$—$N^{\oplus}(CH_3)_3$ $A^{\ominus}$ or

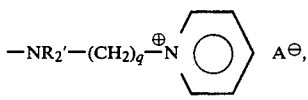

wherein q is 2 or 3, and Q, $R_2'$, $R_3'$ and $R_4'$ are as defined above,
a is 1, 2 or 3, and
q is 2 or 3, and
Q, $R_2'$, $R_3'$ and $R_4'$ are as defined above,
each $R_{10}$ is independently hydrogen, $C_{1-4}$alkyl or $C_{1-4}$alkoxy,
each $R_{11}$ is independently hydrogen, halo, $C_{1-4}$alkyl, $C_{1-4}$alkoxy, $(C_{1-4}$alkyl)carbonylamino, ureido or Zb,
wherein Zb is —NH—CO—$CH_2$—$N(C_{1-2}$alkyl$)_2$, —NH—CO—$CH_2$—$N^{\oplus}(CH_3)_3$ $A^{\ominus}$,

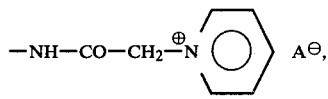

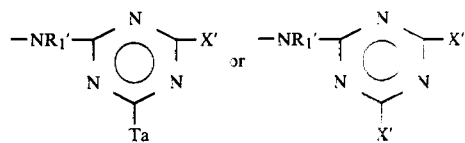

wherein $R_1'$, Ta and X' are as defined above,
each $R_{12}$ is independently hydrogen or $C_{1-4}$alkyl, and
Ya is —CO—, —CO—CH=CH—CO—, —CO—$(CH_2)_q$—CO—,

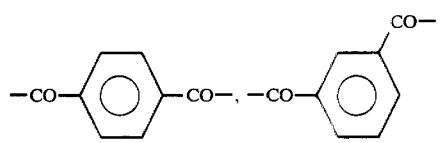

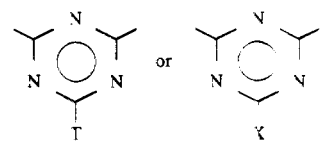

wherein T is halo; hydroxy; amino; $C_{1-4}$alkylamino; di-$(C_{1-4}$alkyl)amino; $C_{1-4}$alkylamino the alkyl moiety of which is monosubstituted by halo or hydroxy; di-$(C_{1-4}$alkyl)amino at least one of the alkyl moieties of which is monosubstituted by halo or hydroxy $C_{5-6}$cycloalkylamino; anilino; substituted anilino having on the phenyl ring 1 or 2 substituents selected from halo, $C_{1-4}$-alkyl, $C_{1-4}$alkoxy, hydroxy and phenoxy or morpholino,
X is —$NR_2$—Q—$NR_3R_4$ or —$NR_2$—Q—$N^{\oplus}R_5R_6R_7$ $A^{\ominus}$,
wherein Q is linear or branched $C_{2-6}$alkylene or —NH—CO—$CH_2$—,
$R_2$ is hydrogen or $C_{1-4}$alkyl,
each of $R_3$ and $R_4$ is independently hydrogen; $C_{1-6}$alkyl; $C_{2-6}$alkyl monosubstituted in the 2-, 3-, 4-, 5- or 6-position by hydroxy or cyano; phenyl($C_{1-3}$alkyl); phenyl($C_{1-3}$alkyl) the phenyl ring of which is substituted by 1 to 3 substituents selected from the group consisting of chloro, $C_{1-4}$alkyl and $C_{1-4}$alkoxy; $C_{5-6}$cycloalkyl or $C_{5-6}$cycloalkyl substituted by 1 to 3 $C_{1-4}$alkyl groups or
—$NR_3R_4$ is pyrrolidino, piperidino or morpholino,
each of $R_5$ and $R_6$ is independently $C_{1-6}$alkyl; $C_{2-6}$alkyl monosubstituted in the 2-, 3-, 4-, 5- or 6-position by hydroxy or cyano; phenyl($C_{1-3}$alkyl); phenyl($C_{1-3}$alkyl) the phenyl ring of which is substituted by 1 to 3 substituents selected from the group consisting of chloro, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, and
$R_7$ is $C_{1-4}$alkyl or benzyl or
—$N^{\oplus}R_5R_6R_7$ is —$NR_7$-pyrrolidinium, —$NR_7$-piperidinium, —$NR_7$—morpholinium, pyridinium, methylpyridinium or dimethylpyridinium,
wherein $R_7$ is $C_{1-4}$alkyl or benzyl, and
q is 2 or 3,
wherein each $A^{\ominus}$ is independently a non-chromophoric anion, and
each halo is independently fluoro, chloro or bromo, with the proviso that the compound may be in acid addition salt form only if it contains at least one non-cationic basic group.

2. A compound according to claim 1, or an acid addition salt thereof,
wherein
the two D"'s are identical,
the two $R_{10}$'s are identical,
the two $R_{11}$'s are identical, and
the two $R_{12}$'s are identical.

3. A compound according to claim 1, or an acid addition salt thereof,
wherein
each $R_{10}$ is independently hydrogen, methyl or methoxy,
each $R_{11}$ is independently hydrogen, chloro, methyl, methoxy, acetamido, ureido or Zb",
wherein Zb" is —NH—CO—CH$_2$—N$^\oplus$(CH$_3$)$_3$ A$^\ominus$,

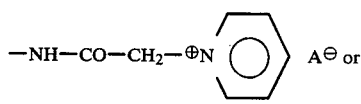

wherein each X'" is independently —NR$_2$'—(CH$_2$)$_p$—NR$_3$"R$_4$", —NR$_2$'—(CH$_2$)$_q$—N$^\oplus$(CH$_3$)$_3$A$^\ominus$ or

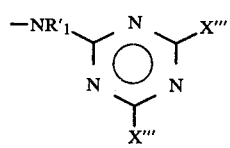

wherein p is 2, 3, 4, 5 or 6,
q is 2 or 3, and
$R_2'$, $R_3''$ and $R_4''$ are as defined below, and
$R_1'$ is as defined below,
each $R_{12}$ is independently hydrogen or methyl,
Ya is —CO—, —CO—CH=CH—CO—, —CO—(CH$_2$)$_2$—CO—,

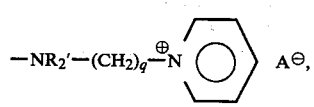

wherein B" is chloro, hydroxy, amino, C$_{1-2}$alkylamino, C$_{2-4}$hydroxyalkylamino, di-(C$_{2-4}$hydroxyalkyl)amino, —NR$_2$'—(CH$_2$)$_q$—NR$_3$'''R$_4$''', —NR$_2$'—(CH$_2$)$_q$—N$^\oplus$(CH$_3$)$_3$ A$^\ominus$ or

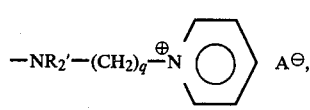

wherein $R_2'$ is hydrogen or methyl,
$R_3'''$ is methyl or ethyl,
$R_4'''$ is methyl or ethyl, and
q is 2 or 3, and
each Z' is independently —CO—NR$_2$'—Q'—NR$_3$"R$_4$", —CO—NR$_2$'—(CH$_2$)$_q$—N$^\oplus$(CH$_3$)$_3$ A$^\ominus$,

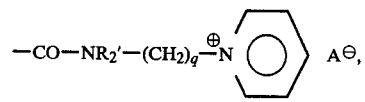

—CO—CH$_2$—N$^\oplus$(CH$_3$)$_3$ A$^\ominus$, —NH—CO—CH$_2$—N(C$_{1-2}$alkyl)$_2$, —NH—CO—CH$_2$—N$^\oplus$(CH$_3$)$_3$ A$^\ominus$,

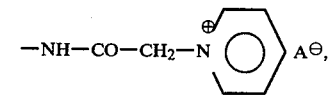

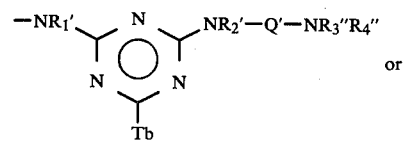

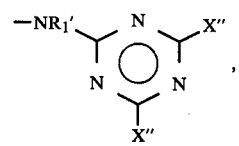

wherein Q' is linear or branched C$_{2-6}$alkylene,
$R_1'$ is hydrogen or methyl,
$R_2'$ is hydrogen or methyl,
each of $R_3''$ and $R_4''$ is independently hydrogen, C$_{1-4}$alkyl or 2-hydroxyethyl or —NR$_3$"R$_4$" is piperidino or morpholino,
Tb is chloro, hydroxy, amino, C$_{1-2}$alkylamino, C$_{2-4}$hydroxyalkylamino or di-(C$_{2-4}$hydroxyalkyl)amino,
each X" is independently —NR$_2$'—Q'—NR$_3$"R$_4$", —NR$_2$'—(CH$_2$)$_q$—N$^\oplus$(CH$_3$)$_3$ A$^\ominus$ or

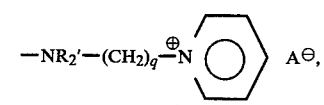

wherein Q', $R_2'$, $R_3''$
q is 2 or 3.

4. A compound according to claim 3, or an acid addition salt thereof,
wherein
the two D"'s are identical,
the two $R_{10}$'s are identical,
the two $R_{11}$'s are identical, and
and two $R_{12}$'s are identical.

5. A compound of the formula

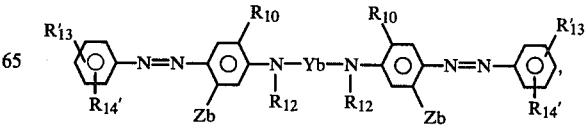

or an acid addition salt thereof,
wherein
each $R_{10}$ is independently hydrogen, methyl or methoxy,
each $R_{12}$ is independently hydrogen or methyl,
each $R_{13}'$ is independently hydrogen, chloro, methyl, methoxy, acetamido, benzamido, sulfamoyl or carbamoyl,
each $R_{14}'$ is independently hydrogen, chloro, methyl or methoxy,
Yb is —CO—, —CO—CH=CH—CO—, —CO—(CH$_2$)$_2$—CO—,

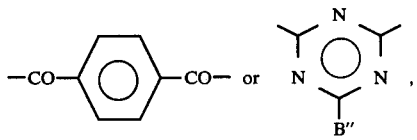

wherein B'' is chloro, hydroxy, amino, $C_{1-2}$alkylamino, $C_{2-4}$hydroxyalkylamino, di-($C_{2-4}$hydroxyalkyl)amino, —NR$_2'$—(CH$_2$)$_q$—NR$_3'''$R$_4'''$, —NR$_2'$—(CH$_2$)$_q$—N$^\oplus$(CH$_3$)$_3$ A$^\ominus$ or

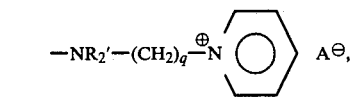

wherein $R_2'$ is hydrogen or methyl,
$R_3'''$ is methyl or ethyl,
$R_4'''$ is methyl or ethyl, and
q is 2 or 3, and
each Zb is independently —NH—CO—CH$_2$—N$^\oplus$(CH$_3$)$_3$ A$^\ominus$,

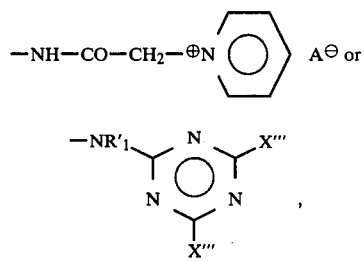

wherein $R_1'$ is hydrogen or methyl, and each X''' is independently —NR$_2'$—(CH$_2$)$_p$—NR$_3''$R$_4''$, —NR$_2'$—(CH$_2$)$_q$—N$^\oplus$(CH$_3$)$_3$ A$^\ominus$ or

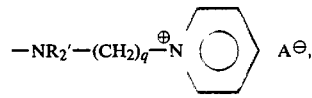

wherein $R_2'$ is hydrogen or methyl,
each of $R_3''$ and $R_4''$ is independently hydrogen $C_{1-4}$alkyl or 2-hydroxyethyl or
—NR$_3''$R$_4''$ is piperidino or morpholino,
p is 2, 3, 4, 5 or 6, and
q is 2 or 3,
wherein each A$^\ominus$ is independently a non-chromophoric anion,
with the proviso that the compound may be in acid addition salt form only if it contains at least one non-cationic basic group.

6. A compound according to claim 5, or an acid addition salt thereof,
wherein
the two

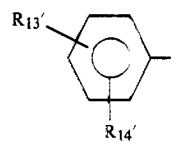

groups are identical,
the two $R_{10}$'s are identical,
the two $R_{12}$'s are identical, and
the two Zb's are identical.

7. The compound according to claim 4 having the formula

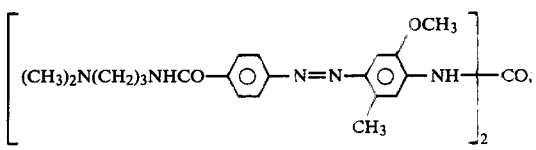

or an acid addition salt thereof.

8. The compound according to claim 4 having the formula

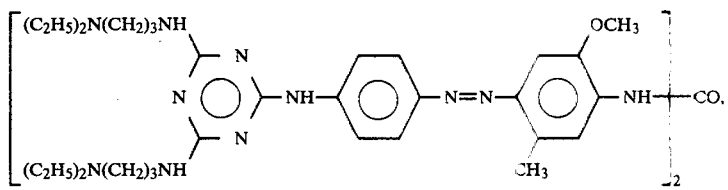

or an acid addition salt thereof.

9. A compound of the formula

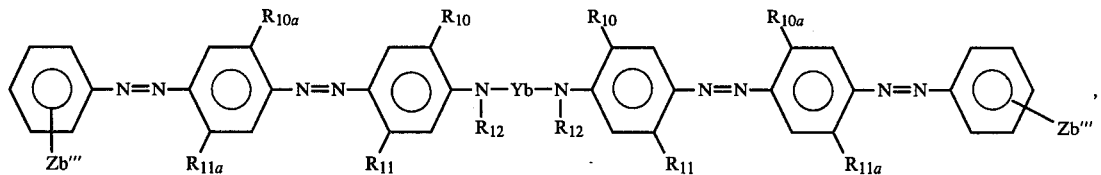

or an acid addition salt thereof,
wherein
each $R_{10}$ and $R_{10a}$ is independently hydrogen, $C_{1-4}$alkyl or $C_{1-4}$alkoxy,
each $R_{11}$ and $R_{11a}$ is independently hydrogen, halo, $C_{1-4}$alkyl, $C_{1-4}$alkoxy, ($C_{1-4}$alkyl)carbonylamino, ureido or Zb,
wherein Zb is —NH—CO—CH$_2$—N(C$_{1-2}$alkyl)$_2$, —NH—CO—CH$_2$—N$^\oplus$(CH$_3$)$_3$ A$^\ominus$,

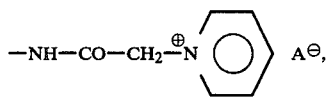

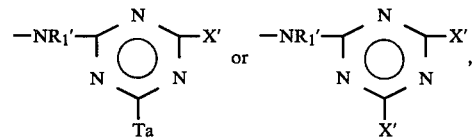

wherein $R_1'$ is hydrogen or methyl,
Ta is chloro, hydroxy, amino, $C_{1-4}$alkylamino, di-($C_{1-4}$alkyl)amino, $C_{2-4}$hydroxyalkylamino, di-($C_{2-4}$hydroxyalkyl)amino, anilino or morpholino,
each X' is independently —NR$_2'$—Q—N$_3'$R$_4'$, —NR$_2'$—(CH$_2$)$_q$—N$^\oplus$(CH$_3$)$_3$ A$^\ominus$ or

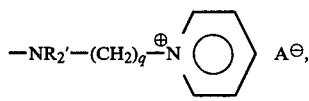

wherein Q is linear or branched $C_{2-6}$alkylene or —NH—CO—CH$_2$—,
$R_2'$ is hydrogen or methyl,
each of $R_3'$ and $R_4'$ is independently hydrogen, $C_{1-6}$alkyl, 2- or 3-n-$C_{2-3}$hydroxyalkyl or benzyl or —NR$_3'$R$_4'$ is pyrrolidino, piperidino or morpholino, and
q is 2 or 3,
each $R_{12}$ is independently hydrogen or $C_{1-4}$alkyl,
Yb is —CO—, —CO—CH=CH—CO—, —CO—(CH$_2$)$_2$—CO—,

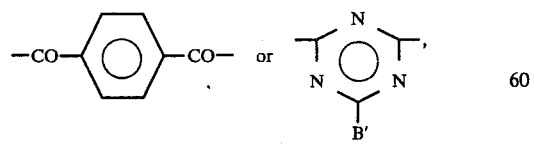

wherein B' is chloro, hydroxy, amino, $C_{1-4}$alkylamino, di-($C_{1-4}$alkyl)amino, $C_{2-4}$hydroxyalkylamino, di-($C_{2-4}$hydroxyalkyl)amino, anilino, morpholino, —NR$_2'$—Q'—NR$_3'$R$_4'$, —NR$_2'$—(CH$_2$)$_q$—N$^\oplus$(CH$_3$)$_3$ A$^\ominus$ or

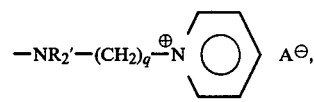

wherein Q' is linear or branched $C_{2-6}$alkylene,
$R_2'$ is hydrogen or methyl,
each of $R_3''$ and $R_4''$ is independently hydrogen, $C_{1-4}$alkyl or 2-hydroxyethyl or —NR$_3''$R$_4''$ is piperidino or morpholino, and
q is 2 or 3, and
each Zb''' is independently

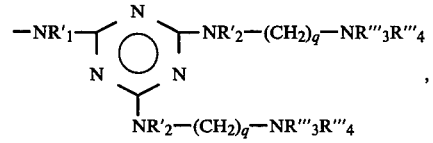

wherein each $R_3'''$ and $R_4'''$ is independently methyl or ethyl, and
each $R_1'$, $R_2'$ and q is independently as defined above,
wherein each A$^\ominus$ is independently a non-chromophoric anion, and
each halo is independently fluoro, chloro or bromo.

10. A compound according to claim 9, or an acid addition salt thereof,
wherein
the two $R_{10}$'s are identical,
the two $R_{10a}$'s are identical,
the two $R_{11}$'s are identical,
the two $R_{11a}$'s are identical,
the two $R_{12}$'s are identical, and
the two Zb''''s are identical and are in the same position of the phenyl ring.

11. A compound according to claim 9, or an acid addition salt thereof,
wherein
each $R_{10}$ and $R_{10a}$ is independently hydrogen, methyl or methoxy,
each $R_{11}$ and $R_{11a}$ is independently hydrogen, methyl, methoxy, acetamido or ureido,
each $R_{12}$ is independently hydrogen or methyl, and
Yb is —CO—, —CO—CH=CH—CO—, —CO—(CH$_2$)$_2$—CO—,

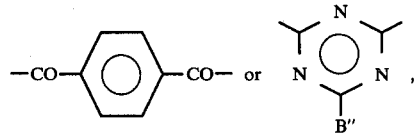

wherein B'' is chloro, hydroxy, amino, $C_{1-2}$alkylamino, $C_{2-4}$hydroxyalkylamino, di-($C_{2-4}$hydroxyalkyl)amino, —NR$_2'$—(CH$_2$)$_q$—NR$_3'''$R$_4'''$, —NR$_2'$—(CH$_2$)$_q$—N$^\oplus$(CH$_3$)$_3$ A$^\ominus$ or

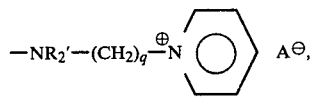

wherein $R_2'$ is hydrogen or methyl,
$R_3'''$ is methyl or ethyl,
$R_4'''$ is methyl or ethyl, and
q is 2 or 3.

12. A compound according to claim 11, or an acid addition salt thereof,

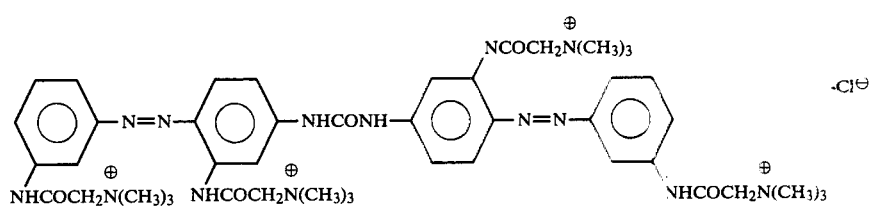

wherein the two $R_{10}$'s are identical,
the two $R_{10a}$'s are identical,
the two $R_{11}$'s are identical,
the two $R_{11a}$'s are identical,
the two $R_{12}$'s are identical, and
the two $Zb''''$'s are identical and are in the same position of the benzyl ring.

13. A compound according to claim 12 having the formula

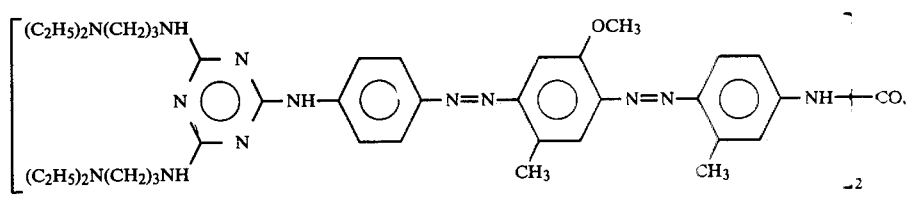

or an acid addition salt thereof.

14. The compound according to claim 4 having the formula

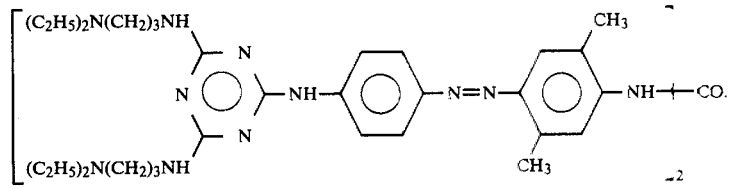

15. The compound according to claim 4 having the formula

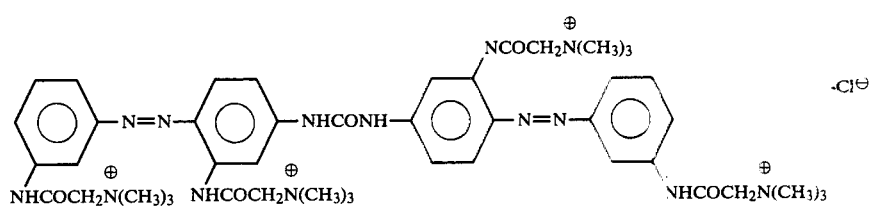

* * * * *